Sept. 8, 1964     H. P. HENDERSON     3,147,824
HEAT INDICATING PROTECTIVE CAP FOR LUBRICANT FITTINGS
Filed Jan. 2, 1962
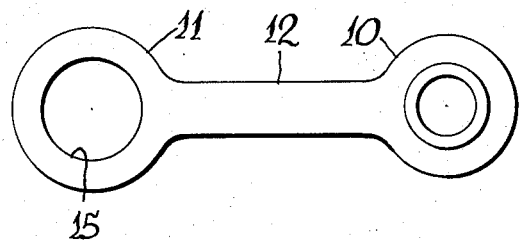
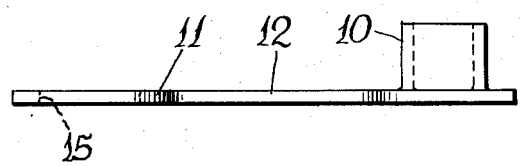
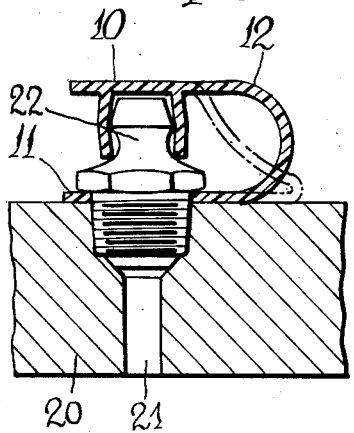
INVENTOR.
Harold P. Henderson,
BY
Christel & Bean
ATTORNEYS.

United States Patent Office 3,147,824
Patented Sept. 8, 1964

3,147,824
HEAT INDICATING PROTECTIVE CAP FOR LUBRICANT FITTINGS
Harold P. Henderson, 271 Northwood Drive, Tonawanda, N.Y.
Filed Jan. 2, 1962, Ser. No. 163,620
1 Claim. (Cl. 184—88)

This invention relates to readily removable protective covers for lubricant fittings which in addition to their covering or encasing function serve as tell-tales or signals for indicating abnormal conditions causing undue heating of bearings with which the lubricant fittings provided with the devices of the present invention are associated.

The protective devices of the present invention are employed with lubricant fittings generally and more particularly with grease fittings of the type known generally in the art as Alemite or Zerk fittings. The devices of the present invention comprise what may be described as captive protective covers which are attached to the lubricant fitting in such a way that they remain attached thereto when the cover portion per se is removed to expose the fitting for lubrication purposes. It is well known that such fittings, especially in automotive use, become very dirty between lubrications and should normally be wiped clean before the lubricant gun is applied.

The devices of the present invention are formed of organic thermoplastic material and comprise generally an attaching portion and a lubricant fitting cover portion, the two being connected by a flexible band or strap. This band, in addition to maintaining connection between the cover and the fitting when the latter is exposed for lubrication, also comprises a signal or tell-tale for indicating an abnormal bearing temperature condition which exists or has existed since the previous lubrication or inspection. The tell-tale is of such nature that the indication or signal remains even though the abnormal temperature condition may no longer prevail, usually because the vehicle or machinery has been idle.

In a preferred form of the invention the device is molded from polyethylene plastic which softens at 180° F. and melts completely at 200° F. If a 180° F. temperature is reached by the strap portion of the device it will sag or droop from the normal position illustrated herein to give a clear indication that such abnormal temperature has been reached. The sag or droop remains after cooling so that the indication remains to be observed at any subsequent inspection, usually at the time of the next succeeding lubrication.

A single specific embodiment of the principles of the present invention is illustrated in the drawing and described in detail in the following specification. However, it is to be understood that such embodiment is illustrative of the principles of the invention and various modifications may be made without departing therefrom, the scope of the invention being limited only as defined in the appended claim.

In the drawing:
FIG. 1 is an elevational view of one form of the lubricant fitting protector and bearing heat indicator device of the present invention in disassembled condition and in the form in which the same is preferably initially molded;

FIG. 2 is a side elevational view of the device illustrated in FIG. 1; and

FIG. 3 is a cross-sectional view of the device of FIGS. 1 and 2 shown applied to a conventional lubricant fitting.

Like characters of reference denote like parts in the several figures of the drawing and the protective and heat indicating device there illustrated comprises a cup-shaped protective or cover element 10 for the normally exposed end of a conventional lubricant fitting, an annular anchoring portion 11, and a connectig somewhat flexible strap or band portion 12. In a preferred form the device of the present invention is molded of low-medium density polyethylene plastic material although other equivalent materials having similar thermal properties may be employed as explained more fully later herein.

In FIG. 3 the device is shown in assembled association with an Alemite lubricant fitting 22 which is fitted to a bearing or bearing housing 20 having a lubricant passage 21 leading from the fitting to the bearing which is to be lubricated, the latter being conventional and not illustrated in the drawing. The anchoring portion 11 has a perforation 15 and in FIG. 3 the loop thus formed is clamped between the hex portion of the lubricant fitting 22 and the bearing housing 20, being thus semi-permanently associated with the fitting.

If desired the device may be applied with the lubricant fitting already in place by merely stretching the loop 11, 15 over the hex portion of the fitting or any analogous base portion of a similar lubricant fitting. This expedient may be employed whenever desired but is particularly suitable in conjunction with lubricant fittings of a type which is not threaded but driven into place in a bearing or bearing housing.

A preferred material for producing the desired visual indication that abnormal heating has occurred in polyethylene, known in the art as of low-medium density. This material has a softening point of about 180° F. and a melting point of about 200° F. Low density polyethylene having a somewhat lower softening and melting point may be employed and other materials having a softening point up to approximately 200° F. and a melting point up to approximately 220° F. may be employed.

As indicated earlier herein, heating the thermoplastic material to its softening point causes the normally self-sustaining band portion thereof to permanently assume a new and distinguishable shape or contour owing to the drooping or sagging that takes place when the softening point is reached or exceeded.

In FIG. 3 the deformed shape of the strap 12 which occurs at or slightly above the softening point is indicated in dot and dash lines. Further and more complete loss of shape occurs at higher temperatures. Of course the illustrated deformation remains after cooling to provide a permanent telltale indication that abnormal temperature has occurred.

While preferred temperature ranges have been referred to above it is to be understood that other organic thermoplastic materials having different softening and melting temperatures may be employed if it is desired to produce a bearing heat indicating signal of a different value than that contemplated herein.

I claim:
In a heat indicating structure for machine bearings, a bearing wall, a lubricant passage therethrough having a threaded portion at its outer end, a lubricant fitting engaging said threaded portion and having a shoulder formation directed toward the outer surface of said bearing wall and an outer portion for engagement with lubricant feeding means, a bearing heat indicator and protective cover for said lubricant fitting outer portion comprising an elongated unitary thermoplastic molding having a lubricant fitting cover portion at one end and an annular portion at the other end held between said shoulder formation and said bearing wall to hold a substantial portion of said molding in heat conducting relationship with respect to said bearing wall and a flexible connecting strap portion, said cover portion being movable to and from fitting covering position by flexure of said strap, said strap being normally self-sustaining in loop form when said cover is applied, the material of said molding being non-self-sustaining at a temperature of the general order of 200° F. whereby attainment of such temperature by said bearing wall permanently impairs the loop configuration to a readily noticeable degree and thus provides a permanent visual indication that an abnormal bearing temperature has existed.

References Cited in the file of this patent

UNITED STATES PATENTS

| | | |
|---|---|---|
| 2,599,472 | Miller | June 3, 1952 |
| 2,694,997 | Alger | Nov. 23, 1954 |
| 2,814,404 | Towns | Nov. 26, 1957 |
| 2,814,405 | Edwards | Nov. 26, 1957 |

FOREIGN PATENTS

| | | |
|---|---|---|
| 535,616 | Great Britain | Apr. 16, 1941 |